Nov. 24, 1936.                    C. W. VOGT                    2,062,278
                         FROZEN COMESTIBLE PACKAGE
                           Filed Jan. 17, 1934
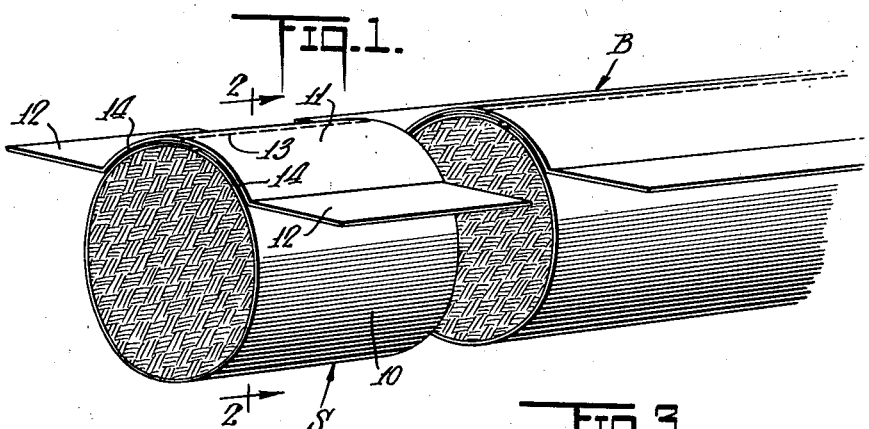
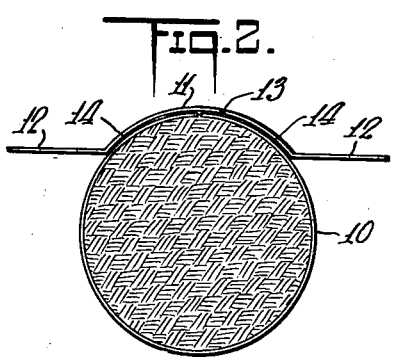
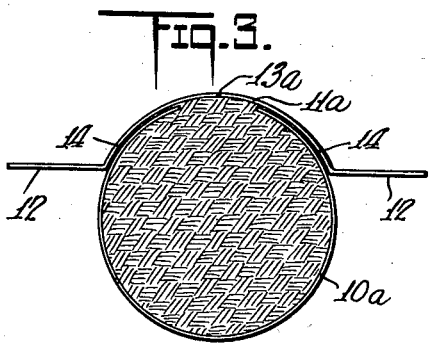
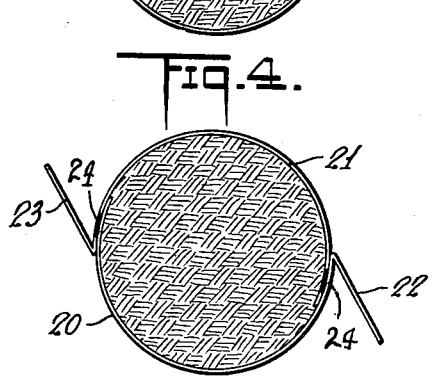
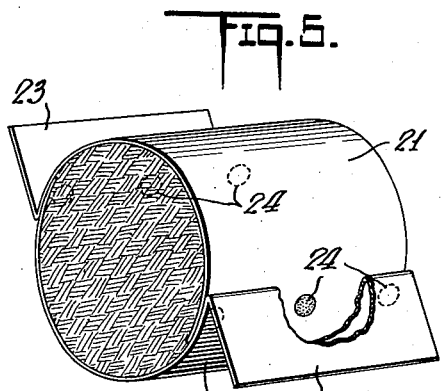
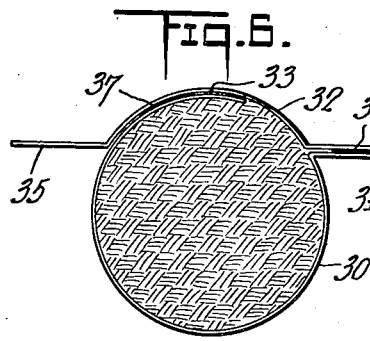
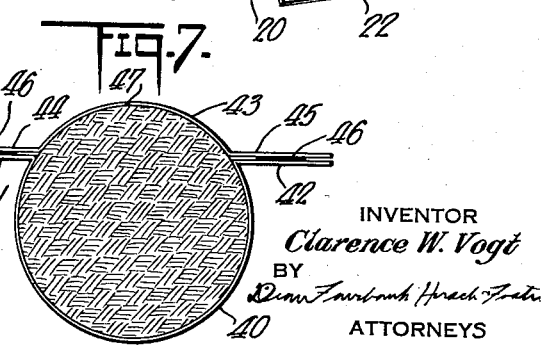
INVENTOR
*Clarence W. Vogt*
BY
ATTORNEYS Patented Nov. 24, 1936

2,062,278

UNITED STATES PATENT OFFICE 2,062,278

FROZEN COMESTIBLE PACKAGE

Clarence W. Vogt, Louisville, Ky., assignor, by mesne assignments, to The Girdler Corporation, Louisville, Ky., a corporation of Delaware Application January 17, 1934, Serial No. 707,005

9 Claims. (Cl. 99—180)

This invention relates to enwrapped individual service portions of ice cream or similar frozen comestibles.

My prior Patent No. 1,906,183 dated April 25, 1933, points out various objectionable features of prior methods of packaging and dispensing ice cream or other solidified comestibles normally liquid at body temperature and discloses one type of package which may be readily formed and which permits of ready unwrapping and depositing of its contents in a plate, glass, ice cream cone or other receptacle.

My present invention relates to improvements in wrappers of the general character illustrated in my prior patent.

An object of this invention is to provide an enwrapped block of frozen comestible in which the wrapper is positively prevented from opening up or unfolding in the course of handling or shipment even though the temperature varies widely and to provide a wrapper which does not rely either upon its own stiffness or the stiffness of the ice cream or any bond with the ice cream to assure its maintenance in proper position.

Another object is to provide a package having a readily removable wrapper which may be filled to true cylindrical form by plastic comestible delivered under pressure and without liability of expansion, enlargement, distortion or opening up of the peripheral wall during the forming and filling operation.

Another object is to provide an enwrapment including projecting tabs to be grasped and pulled for liberating the enwrapped block of ice cream, and in which a simple pull upon the tabs will be effective to cause separation of the wrapper parts and unwrapping despite the security which the wrapper affords against inadvertent opening.

Another object is to provide a wrapper having a portion weakened to facilitate the rupturing and which will readily give way when the tabs are pulled.

Another object is to provide an inexpensive, readily manipulable wrapper through which the ice cream will not leak even though it softens up and in which in certain embodiments of the invention, the weakened portion of the wrapper is protected from communication with the material which the wrapper encloses.

Partial freezing of the ice cream may be accomplished by the use of a continuous freezer which thoroughly incorporates the desired amount of air and continuously extrudes a bar or rod of ice cream which is continuously wrapped and after proper hardening, cut into sections of a size and shape suitable for use as individual service portions of ice cream. A suitable mechanism for accomplishing this is illustrated and described in various prior patents and applications, all of which are identified in Patent No. 1,906,183.

This application is a continuation in part of my copending application Serial No. 678,625, filed July 1, 1933, now Patent No. 2,023,629, issued Dec. 10, 1935.

The invention may be more fully understood from the following description in connection with the accompanying drawing wherein:—

Fig. 1 is a perspective view of a portion of a long bar of ice cream with an individual service portion cut from the end thereof, Fig. 2 is a transverse sectional view through such portion for instance on the line 2—2 of Fig. 1, Fig. 3 is a view similar to Fig 2 but illustrating a modification, Fig. 4 is a view similar to Fig. 2 but illustrating a further modification, Fig. 5 is a perspective view of the type of wrapper shown in Fig. 4, and Figs. 6 and 7 are similar to Fig. 2 but illustrating further modifications.

The material which is enwrapped may be ice cream, water ice, sherbet or any generally similar frozen comestible material which is normally liquid at body temperature, and which is served in a frozen condition. This material is continuously formed and wrapped and hardened as a bar or rod B, two or more strips of paper or equivalent material which constitute the wrappers being folded and assembled around the nozzle from which the ice cream is extruded and sub-divided after hardening into inividual service portions S.

Mechanism of the general type shown in my Patents 2,006,375 and 2,006,376, issued July 2, 1935, may be employed for this purpose. These patents illustrate certain embodiments of my present invention.

The wrapper for the portion S shown in Fig. 1 includes a section 10 of paper of proper length to extend completely around the periphery of the cylindrical block of ice cream with the edges of the wrapper strip in actual or substantial abutment although there may be a slight gap or overlap.

The intermediate portion of a second section 11 of paper is folded partially (preferably less than half way) around the tubular wrapper 10, the ends of section 11 projecting as laterally extending tabs 12. The sealing section 11 is preferably so disposed with respect to section 10 that the lines of abutment of the edges of section 10 lie approximately at the center of section 11. The wrapper section 11 may be of very much thinner material than that of the wrapper section 10 and preferably has a longitudinally extending weakened line 13 disposed off center with respect to the median line of this section so that it is out of registration with the crack, gap or crevice at the abutting edges of main section 10. Thus any meltage accumulating near the region of the crevice cannot escape through the perforations or slits which constitute the weakening line.

At each side of the weakening line sections 10 and 11 are secured together by longitudinally extending stripes of adhesive material indicated at 14, these spaced gummed areas serving to affix section 11 to section 10 at opposite sides of the crevice and at opposite sides of the weakened line 13. Thus when the tabs 12 are grasped and pulled in opposite directions section 11 will rupture at the weakened line, and as the two parts of this ruptured section are attached to the section 10 near the edges of the latter, continuation of this pull will liberate the block of cream.

The ice cream block is preferably of proper size and shape to constitute an individual service portion. A cylindrical shape is preferred and a block of little or no greater length than the diameter is also preferred but it will be understood that variations in the cross sectional shape or the relative length and thickness of the block are within the scope of the invention. One advantage of using cylindrical blocks of cream is the fact that when a number of blocks are placed on end in lateral abutment in a layer, finger spaces are of necessity provided between adjacent blocks so that a block may be readily lifted out of a closely packed layer. Such packages are shown in my prior Patents 2,001,475, 2,001,476 and 2,001,478, issued May 14, 1935. Also the block may be more easily inserted in a soda water glass or in a cone.

The form of the invention illustrated in Fig. 3 is similar to that of Figs. 1 and 2 save that the strip 10a corresponding to the strip 10, does not completely encircle the cylinder of cream and the weakened line 13a corresponding to the weakened line 13 may if desired be disposed centrally instead of off center with respect to the strip 11a corresponding to the strip 11.

In Figs. 4 and 5 I have illustrated an embodiment of the invention in which the two wrapper strips 20 and 21, each extend slightly more than half way around the block. One end of each strip overlaps the end of the other and the outer or overlapping ends being transversely creased before or after application of the bar, are bent outwardly to form the two tabs or wrapper extensions 22, 23 at diametrically opposite sides of the package.

The overlapped ends of the wrapper strips are secured together by lines of spaced spots 24 or by continuous stripes of adhesive material of a character which is somewhat hygroscopic, that is to say, this adhesive is preferably of such a nature that, having been applied to one of the surfaces of the paper and having become "tacky", and thereafter the second piece of paper having been made to contact with the adhesive, preferably with the use of a heating element to accelerate the sticking and driving of the adhesive into the pores of the paper as it passes under the heating element, (as shown in said Patent 2,006,376) the adhesive will at first have a substantial "bonding" effect, either due to this drying effect coupled with the fact that if the wrapment is being filled with semi-frozen ice cream of a temperature of about 20° F., the coldness inside of the tube will cause a momentary freezing of some of the free moisture. Later on, due to the gradual absorption of moisture by the paper from the ice cream, this moisture will tend to soften the glue (that is, if the glue, as above mentioned, is of a hygroscopic nature). Due to the fact that the ice cream is quite cold, this moisture penetration requires comparatively longer time to take effect than if the product within the tube were relatively warmer. The result is that during the manufacture of portions containing my wrapper and with an adhesive of the characteristics above described, there will at first be a considerable bonding of the two halves of the wrapment strips at the overlapping ends, but later on, during storage and/or transportation and/or during the time that the product is in the dealer's cabinet, these glue spots or strips would have again become sticky and softer. Therefore when the tabs 22 and 23 are pulled, peeling apart of the overlapping ends of the wrapper at the glue or adhesive spots or areas will readily occur, and the block of cream will be liberated without objectionable deformation even though the cream is of a relatively soft consistency due to abnormally warm temperature of the ice cream cabinet which sometimes occurs. I have found that the addition of glycerine and glucose to commercial adhesives serves this purpose satisfactorily, though I would not limit myself to this type of adhesive, as I have also found that ice cream mix itself and/or some of the binders and/or gums sometimes used in lieu of gelatine serves to accomplish the desired effect. One advantage of the use of such types of adhesives rests in their edible nature.

In Fig. 6 a wrapper strip 30 of sufficient length to completely encircle the bar is employed but instead of bringing the ends of this strip together one end of the strip is turned outwardly to form a tab 31. A second or sealing strip 32 has a central weakening line 33 therein. One end of strip 32 defines a tab 34 overlying the tab 31. The intermediate portion of the strip 32 covers the ice cream which would otherwise be exposed by the strip 30, overlaps the non-tab-forming end of the strip 30 and is bent to provide a second tab 35. The two sections are connected together by stripes or spots of adhesive material, one adhesive area 36 connecting the tabs 31, 34 and the other adhesive area 37 connecting the overlapped portions of the two sections. It will be observed that the weakened line 33 is between the two adhesive stripes 36, 37 and is protected by the concealed end of the section 30.

In Fig. 7 there is illustrated another embodiment of the invention in which a strip of paper 40 approximately long enough to completely enwrap a block of cream extends about three-quarters of the way around it and has both of its ends bent outwardly to define tabs 41, 42. A second strip 43 complementing the first strip extends about one-quarter of the way around the block, closing the gap left by the first strip and has its ends bent outwardly to define tabs 44, 45 of the same length as the tabs 41, 42 and overlying said tabs, the two sets of tabs being connected together by glue stripes 46 and the shorter wrapper forming section having a longitudinal weakened line 47 therein.

It will be observed that in all forms of the invention in which one strip has a weakened line, the tabs are so disposed with respect to this line that a continuous pull on the tabs after rupture and in the same direction which caused the rupture will effect unwrapping of the encased comestible, and in all of the forms the wrapper is formed of a plurality of sections secured together by adhesive so that the wrapper will not open up and the sections present tabs which may be pulled to first break a seal and then peel off the wrapper.

Having thus described my invention, what I claim as new and desire to secure by Letters Patent is:—

1. A frozen comestible package including a solid block of ice cream or the like and a wrapper including a plurality of separate sections of sheet material, said sections cooperatively peripherally enclosing the block and including overlapping portions, spaced lines of adhesive material securing the overlapped portions of the sections together, said wrapper affording outwardly projecting finger tabs and one of said sections having a weakened line therein between the lines of adhesive material whereby said section is adapted to rupture when the tabs are pulled in opposite directions.

2. An individual service portion of ice cream or the like, comprising a substantially cylindrical block of ice cream, and a wrapper including a pair of sections of sheet material, each of a width substantially equal to the length of the block, one of said sections extending around more than one-half the circumference of said block and the other section being adhesively secured to the first mentioned section adjacent to the opposite edges of the latter and extending along a part of the periphery of the block, said second mentioned section having terminal portions forming tabs adapted to be pulled apart to sub-divide the second mentioned section into two parts and remove the wrapper.

3. A comestible package including a substantially solid block and a wrapper including a pair of sections of sheet material, one of said sections extending more than halfway around the periphery of the block, another of said sections being folded to follow the periphery of the block and overlapping the ends of the first section, means adhesively connecting the overlapped portions of the two sections, the ends of said second section being bent outwardly to afford finger tabs and said second section having a weakened line intermediate the lines of adhesive engagement with the first section and in the region of overlap of said sections.

4. A frozen comestible package including a substantially solid block of ice cream and a wrapper including a plurality of separate sections of sheet material, one of said sections extending around substantially the entire periphery of said block and another of said sections extending across the gap between the ends of the first mentioned sections and having a weakened line opposite said gap and having oppositely disposed outwardly extending end portions serving as tabs and adapted to be pulled apart to break the second mentioned section along said weakened line and remove said wrapper.

5. As a new article of manufacture a solidified body of edible material normally liquid at body temperature and a paper wrapper formed of two sections, one section extending substantially completely about the periphery of the body, the other section being wrapped about the first section and concealing the ends of the latter and adhesively secured to said ends and terminating in a pair of projecting tabs and having a weakened line intermediate its points of adhesive engagement with the first section whereby a pull on the tabs is effective to rupture the second section and peel the first section from the block.

6. A substantially solid block of ice cream or the like of uniform cross sectional shape throughout its length and a peripheral paper wrapper for the block, the wrapper including overlapping portions, a hygroscopic adhesive securing the overlapping portions of the wrapper against inadvertent unfolding but not so tightly but what said portions may be pulled apart, the outer of said portions forming a tab extending the full length of said block and of substantially uniform width throughout its length and projecting from the wrapper and adapted to be pulled to release the adhesive bond and peel the wrapper from the block.

7. As a new article of manufacture, a package including a solidified body of edible material normally liquid at body temperature, and a paper wrapper formed of two sections, each extending approximately one-half of the distance around the block, and each section having projecting tab portions at opposite edges, the tab portions of one section being superposed on and secured to the tab portions of the other section, one of said sections being of very much thinner material than the other and having a weakened line extending lengthwise thereof, whereby the section may be broken upon pulling on said tabs in opposite directions.

8. As a new article of manufacture, an individual service portion of ice cream or the like, comprising a substantially cylindrical block of ice cream and a wrapping including two sections, each of a length equal to the length of the block, and each extending only part way around the periphery of said block, the two sections being adhesively secured together and cooperatively forming a tube covering the entire periphery of said block, said sections having flaps integral therewith, extending the full length of said block, peripherally spaced on said tube, and adapted to be pulled apart to open up the tube and remove the wrapping.

9. As a new article of manufacture an individual service portion formed from an extruded and hardened bar of ice cream or the like, comprising a substantially cylindrical block of ice cream, and a wrapping having its opposite ends terminating in the planes of the ends of said block and including two overlapping portions adhesively secured together, the outer of said portions having a flap projecting peripherally of the block beyond the said adhesive, and extending the full length of said block and of substantially uniform width and serving as a tab adapted to be grasped for peeling the wrapping from said block.

CLARENCE W. VOGT.